3,338,612
DOOR LOCKS OR LATCHES OF PASSENGER
VEHICLES
Kenneth C. Howard, Fort Worth, Tex., assignor to Bass
Brothers Enterprises, Inc., Fort Worth, Tex.
Filed Sept. 27, 1965, Ser. No. 490,245
11 Claims. (Cl. 292—340)

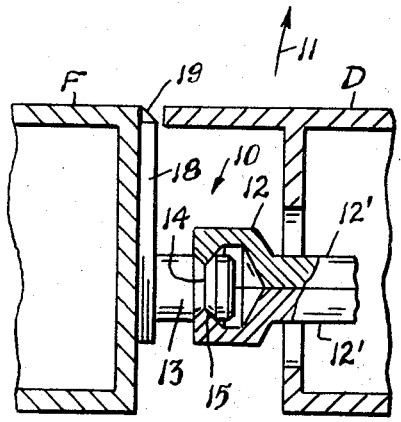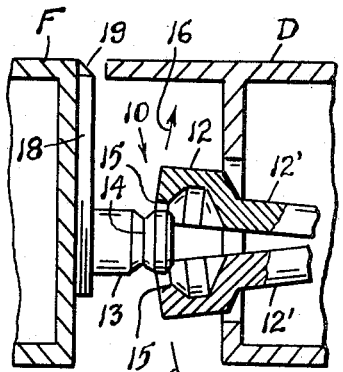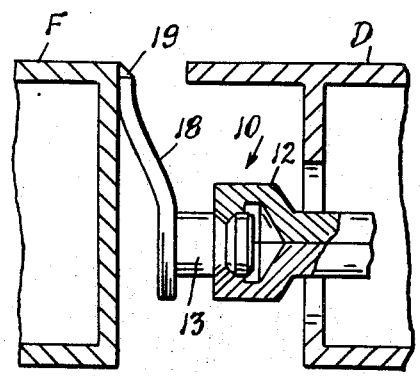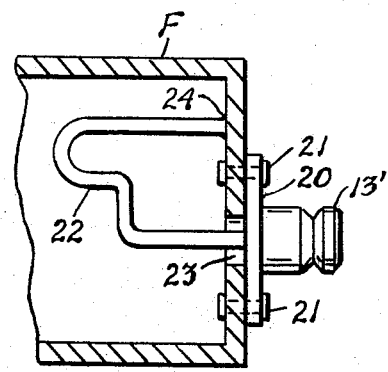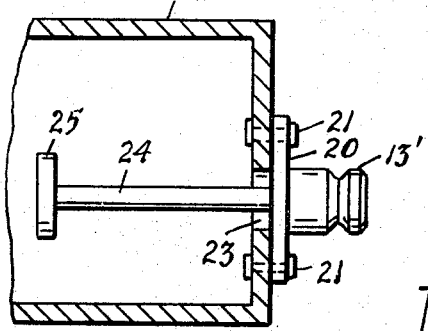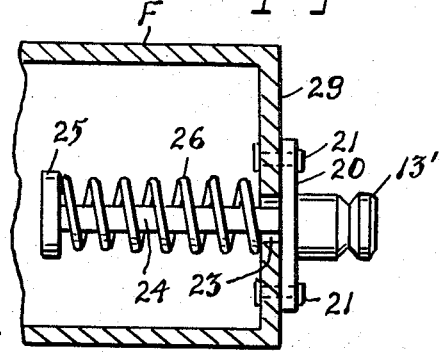

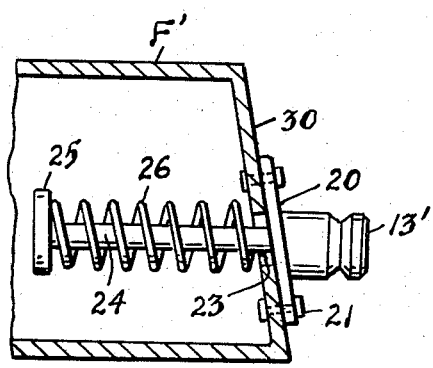
FIG-7-
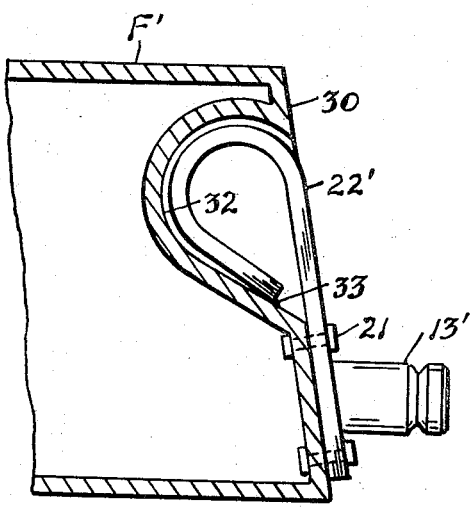
FIG-8-
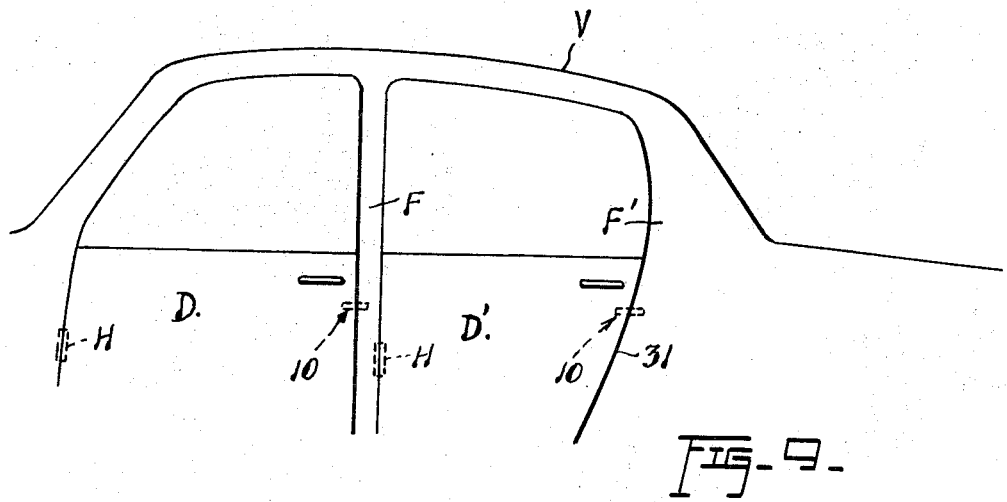
FIG-9-
INVENTOR
Kenneth C. Howard
BY Munson H. Lane
ATTORNEY United States Patent Office 3,338,612
Patented Aug. 29, 1967

ABSTRACT OF THE DISCLOSURE

This application discloses the combination in an automobile body or the like of a door frame, a cooperating door having a predetermined normal position with respect to said frame, and a positively acting door latch comprising a first latch member carried by said door, a second latch member adapted for engagement with the first latch member to keep the door closed, said latch including coacting means carried by the first and second latch members respectively, for positively holding said latch members in engagement at all times except when manually unlocked, and means mounting said second latch member on said door frame, said mounting means being yieldable to permit limited movement of the second latch member relative to the door frame whereby the second latch member may remain in engagement with the first latch member to tether the door in a substantially closed position when the normal relative position of the door and the frame is altered.

---

This invention relates to new and useful improvements in door locks or latches of passenger vehicles such as automobiles or the like, and the principal object of the invention is to assure holding of the door in a closed or substantially closed position to prevent occupants from being thrown out of the vehicle as often happens in instances of collisions or other accidents.

Conventional door locks or latches quite satisfactorily hold the vehicle door closed as long as a predetermined relative position exists between the door and its door frame. However, when under accident conditions that relative position is forcibly altered by buckling or springing of either or both, the frame and the door, the latch member attached to the door becomes displaced out of alignment with or disengaged from the latch member attached to the door frame, or vice versa, so that the latch members are no longer capable of holding the door closed and opening of the door results in the occupants falling or being thrown out of the vehicle.

The invention eliminates this defect of conventional door latches by providing yieldable means for mounting the frame carried latch member on the door frame, such mounting means being yieldable so that if for any reason the predetermined normal relative position of the door and the frame is altered, the yieldably mounted latch member may remain in locking engagement with the door mounted latch member to tether the door in a closed or substantially closed position.

The device of the invention is simple in construction, dependable in operation, easy to install, and adaptable to economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIG. 1 is a fragmentary horizontal sectional view showing a door, a door frame and the latch of the invention in its engaged position under normal clearance conditions between the door and the frame;

FIG. 2 is a view similar to that in FIG. 1, but showing the latch members as being disengaged to permit opening of the door;

FIG. 3 is a view similar to that in FIG. 1, but showing the engaged latch members under abnormal clearance conditions between the door and the frame;

FIG. 4 is a fragmentary horizontal sectional view of the door frame equipped with a modified embodiment of its associated latch member;

FIG. 5 is a view similar to that in FIG. 4, but showing another modified embodiment of the door frame latch member;

FIG. 6 is a view similar to those in FIGS. 4 and 5, but showing a further modified embodiment of the latch member;

FIG. 7 is a fragmentary view of the embodiment of FIG. 6 mounted in a bevel-edged door frame;

FIG. 8 is a fragmentary view of another modified embodiment; and

FIG. 9 is a diagrammatic, side elevational illustration of a vehicle body with front and rear doors showing locations of the door latches.

Referring now to the accompanying drawings in detail, more particularly to FIGS. 1–3, the reference character D designates a portion of a vehicle door cooperating with a door frame or door post F, while the door latch of the invention is designated generally by the numeral 10. It will be understood that the door D is hinged for opening movement as indicated by the arrow 11 and that a predetermined normal position exists between the door and its frame, in accordance with customary practice, so that the latch 10 is capable of performing its function of keeping the door closed. The door latch 10 is a positively acting latch and comprises a first latch member 12 carried by the door D and a second latch member 13 which is associated with the door frame F. For purposes of illustration the latch member 13 has been shown as being in the form of a cylindrical stud provided with an annular groove 14 for positive engagement by inturned semi-circular jaws 15 formed on a pair of complemental half-sections 12', 12' of the latch member 12, so that when the jaws 15 of the member 12 are seated in the groove 14 of the member 13, the latch is positively engaged and the door is held in its closed position. The sections 12', 12' of the latch member 12 are operatively connected to the door latch actuating handle (not shown), so that when it is desired to open the door, the sections 12', 12' are first spread apart to withdraw the jaws 15 from the groove 14 of the member 13 as indicated by the arrows 16 in FIG. 2, and then the whole latch member 12 is pulled away from the member 13 and retracted into the door D, as indicated by the arrow 17, thus permitting the door to be opened. Thus, the latch is of what may be referred to as an external contracting type, but an internal expanding type of latch may also be employed, if so preferred, it being understood that details of the latch members 12, 13 as shown are for illustrative purposes only and that any suitable latch members may be utilized, as long as they are of the positively acting type. In the context of the invention "positively acting" latch members must have the ability to remain in engagement, one with the other under abnormal conditions, when there is no intention to manually unlock the latch.

Unlike in conventional practice, the frame associated latch member 13 is not secured directly to the door frame F. Rather, it is secured to one end portion of an elongated, flexible or bendable element or mounting means such as a strap 18, the other end of which is secured, as by welding 19, for example, to the jamb of the door frame itself. Normally, the strap 18 lies flat against the outer surface of the door frame F as shown in FIGS. 1 and 2, when a positional relationship exists between the frame and the door D. However, when as in accident, the door pulls away from the frame or vice versa, either or both by warping, springing, flexing, bending, buckling or other deformation of the door and/or the frame, the positive engagement of the latch members 12, 13 causes the strap 18 to yield and be pulled away from the frame F in a direction at least generally longitudinal with reference to the normal axis of latch 10 as shown in FIG. 3, while still remaining secured thereto by the weld 19. As a result of the yieldable character of the strap 18, the latch member 13 is permitted to move away from the frame F, but still remains in its positive locking engagement with the latch member 12 on the door D, so as to tether the door in a closed or substantially closed position regardless of the abnormally altered positional relationship between the door and its frame.

FIG. 4 illustrates a modified arrangement wherein the latch member 13' is secured to a mounting plate 20 which, in turn, is secured to the frame F by frangile or rupturable fasteners 21, such as frangible rivets, for example. In the presence of a pulling force tending to move the latch member 13' and plate 20 relative to the frame F in a direction at least generally longitudinal with reference to the axis of the latch 10, the fasteners 21 become ruptured so that the latch member 13' is permitted to move relative to the frame while still remaining in positive locking engagement with the door carried latch member 12. However, tethering means are provided to limit the extent of movement of the member 13', relative to the frame, these tethering means comprising an elongated, flexible element 22 which is suitably secured at one end thereof to the mounting plate 20 and extends slidably through an aperture 23 into the frame F, having its other or inner end secured to the inside of the frame at as 24. It will be apparent that when the fasteners 21 are ruptured, the latch member 13' will be able to move relative to the frame F within limits imposed by the length of the tethering element 22, thus assuring that the door remains in a substantially closed position.

FIG. 5 shows another modification which is similar to the embodiment of FIG. 4, except that the tethering element 22 is substituted by an elongated tether element 24 which may or may not be flexible. For example, the element 24 may be a metal rod or a length of cable, having one end thereof secured to the mounting plate 20 and projecting slidably into the frame F through the aperture 23. The inner end of the element 24 is provided with suitable stop means 25, whereby to limit the extent to which the element 24 may be projected outwardly from the frame F to keep the door in a substantially closed position.

Finally, FIG. 6 shows another modified embodiment similar to that in FIG. 5, except that a shock absorber in the form of a compression spring 26 is provided inside the frame F on the tethering element 25, between the inside of the frame and the stop means 25, in order to bias the tether element inwardly and press the mounting plate 20 of the latch member 13' against the frame F. In this embodiment the fasteners 21 may be omitted, if the resiliency of the spring 26 is sufficient to maintain the plate 20 against the frame F under normal conditions. In any event, in the presence of a force causing the plate 20 to separate from the frame F, the shock absorber spring 26 will serve to prevent the door from whipping or flapping, while it is tethered in a substantially closed position by the tether element 24.

FIG. 7 shows the latch embodiment of FIG. 6 installed in a door frame F' which has a bevelled edge 30 rather than a right-angular edge 29 such as appears at 29 in FIG. 6. The bevelled edge 30 of the frame F' coacts with a complementary bevelled edge of the door D', particularly of the rear door of the vehicle V as diagrammatically shown in FIG. 9, it being understood that under contemporary practices the edge of the door opposite from the hinges H may not only be bevelled, but may also have a curvilinear form, as exemplified at 31 in the instance of the rear door in FIG. 9. The primary purpose of this illustration is to show that because of the bevelled and curvilinear form of the door edge, and of the complementally bevelled and curvilinear form of the associated door frame, the door and the frame under accidental conditions can become displaced relative to each other in almost any direction, so that unintentional opening of the door may result if the latch member on the door frame is not capable of movement along with the latch member on the door while being tethered to the door frame by the means of the invention.

In FIG. 8 the latch member 13' is carried by one end of a flexible strap 22', the other end portion of which is curved and normally accommodated in a recess 32 formed with the bevelled edge 30 of the frame F', being secured therein as indicated at 33. In the presence of abnormal forces tending to open the door, the fasteners 21 which normally hold the strap 22' in place become ruptured, so that the curved portion of the strap is free to move out of the frame recess 32 while permitting the latch member 13' to remain in engagement with the associated latch member on the door.

It will be understood from the foregoing that the latch member 13 or 13' is so mounted as to be generally longitudinally yieldable with reference to the normal axis of the latch 10 although some yielding in other directions will be permitted by reason of the herein disclosed mounting of such latch member 13 or 13'.

While in the foregoing there have been described and shown certain preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

I claim:

1. In an automobile body or the like, the combination of a door frame, a cooperating door having a predetermined normal position with respect to said frame, and a positively acting door latch comprising a first latch member carried by said door, a second latch member engaging the first latch member to keep the door closed against at least longitudinal and lateral separation, and yieldable means mounting said second latch member on said door frame, said mounting means being yieldable to permit movement of the second latch member relative to the door frame whereby the second latch member may remain in engagement with the first latch member to tether the door in a substantially closed position when the normal relative position of the door and the frame is altered, said yieldable mounting means comprising an elongated flexible element secured at one end thereof to said door frame and having said second latch member secured to the other end thereof, said flexible element comprising a bendable strap connected with the door frame and second latch member at laterally spaced points.

2. The combination defined in claim 1 wherein the bendable strap normally lies in contact with the door frame throughout the major portion of its length.

3. The combination as set forth in claim 1 wherein the door frame is hollow and the bendable strap is attached at one end only to the inside of the door frame and at the opposite end to the second latch member, the intermediate portion of the strap being normally principally housed within the door frame, and including a portion extending through the jamb of the door frame.

4. In an automobile body or the like, the combination of a door frame, a cooperating door having a predetermined normal position with respect to said frame, and a positively acting door latch comprising a first latch member carried by said door, a second latch member engaging the first latch member to keep the door closed, and yieldable means mounting said second latch member on said door frame, said mounting means being yieldable to permit movement of the second latch member relative to the door frame whereby the second latch member may remain in engagement with the first latch member to tether the door in a substantially closed position when the normal relative position of the door and the frame is altered, said yieldable mounting means comprising a rupturable fastener securing said second latch member to said door frame, and means tethering said second latch member to the door frame when said fastener is ruptured.

5. In an automobile body or the like, the combination of a door frame, a cooperating door having a predetermined normal position with respect to said frame, and a positively acting door latch comprising a first latch member carried by said door, a second latch member engaging the first latch member to keep the door closed, and yieldable means mounting said second latch member on said door frame, said mounting means being yieldable to permit movement of the second latch member relative to the door frame whereby the second latch member may remain in engagement with the first latch member to tether the door in a substantially closed position when the normal relative position of the door and the frame is altered, said yieldable mounting means comprising a rupturable fastened securing said second latch member to said door frame, an elongated tethering element connected at one end thereof to said second latch member, said tethering element extending into the door frame and being projectable outwardly therefrom when said fastener is ruptured, and stop means provided at the inner end of said tethering element inside the door frame to limit the extent of outward projection of the tethering element.

6. The combination as defined in claim 5 together with a resiliently compressible shock absorber provided on said tethering element between the inside of the door frame and said stop means.

7. The combination as defined in claim 4 wherein said yieldable mounting means comprises a tethering element connected at one end thereof to said second latch member, said tethering element extending into the door frame and being projectable outwardly therefrom, stop means provided at the inner end of said tethering element inside the door frame to limit the extent of outward projection of the tethering element, and a compression spring provided on said tethering element between the inside of the door frame and said stop means to bias the tethering element to its retracted position in the door frame.

8. In an automobile body the combination of a door frame, a cooperating door having a predetermined normal position with respect to said frame, and a positively acting door latch comprising a first latch member carried by said door, a second latch member engaging the first latch member to keep the door closed, said latch including coacting mechanical means carried by said first and second latch members respectively, for positively holding said latch members in engagement against at least longitudinal and lateral separation except when intentionally manually actuated, and means mounting said second latch member on the adjacent jamb face of said door frame, said mounting means operating to mount said second latch member to prevent lateral opening of said door under normal conditions, and being yieldable, at least generally longitudinally, to permit movement of the second latch member relative to the door frame whereby the second latch member may remain in engagement with the first latch member to tether the door in a substantially closed position when the normal relative position of the door and the frame is altered, said mounting means including separable holder means secured to said second latch member and engageable with the outside of said door frame, a tethering element extending inwardly from said second latch member into the door frame and being projectable outwardly therefrom when said holder means is separated from engagement with the door frame, and stop means carried by said tethering element inside the door frame to limit the extent of outward projection of the tethering element.

9. In an automobile body the combination of a door frame, a cooperating door having a predetermined normal position with respect to said frame, and a positively acting door latch comprising a first latch member carried by said door, a second latch member engaging the first latch member to keep the door closed, said latch including coacting mechanical means carried by said first and second latch members respectively, for positively holding said latch members in engagement against at least longitudinal and lateral separation except when intentionally manually actuated, and means mounting said second latch member on the adjacent jamb face of said door frame, said mounting means operating to mount said second latch member to prevent lateral opening of said door under normal conditions, and being yieldable, at least generally longitudinally, to permit movement of the second latch member relative to the door frame whereby the second latch member may remain in engagement with the first latch member to tether the door in a substantially closed position when the normal relative position of the door and the frame is altered, said mounting means including separable holder means secured to said second latch member and engageable with the outside of said door frame, a tethering element extending inwardly from said second latch member into the door frame and being projectable outwardly therefrom when said holder means is separated from engagement with the door frame, and stop means carried by said tethering element inside the door frame to limit the extent of outward projection of the tethering element, together with resiliently compressible means associated with said tethering element and reacting between the inside of the door frame and said stop means.

10. In an automobile body the combination of a door frame, a cooperating door having a predetermined normal position with respect to said frame, and a positively acting door latch comprising a first latch member carried by said door, a second latch member engaging the first latch member to keep the door closed, said latch including coacting mechanical means carried by said first and second latch members, respectively, for positively holding said latch members in engagement against at least longitudinal and lateral separation except when intentionally actuated, and means mounting said second latch member on the adjacent jamb face of said door frame, said mounting means operating to mount the second latch member to prevent lateral opening of the door under normal conditions and being yieldable, at least generally longitudinally, to permit movement of the second latch member relative to the door frame whereby the second latch member may remain in engagement with the first latch member to hold the door in a substantially closed position when the normal relative position of the door and the frame is altered, said yieldable mounting means including separable fastening means carried by the second latch member and holding said latch member in engagement with the outside face of the jamb of said door frame during normal operation, and means tethering said second latch member to the door frame when the fastening means is separated from the door frame.

11. A positively acting door latch for automobiles, comprising in combination a first latch member adapted to be carried by a door, a second latch member adapted for engagement with the first latch member to keep the door closed, said latch including coacting mechanical means carried by the first and second latch members, respectively, for positively holding said latch members in engagement against at least longitudinal and lateral separation except when intentionally actuated, and mounting means connected to said second latch member for mounting the same on the adjacent jamb face of a cooperating door frame, said mounting means operating to mount the second latch member to prevent lateral opening of the door under normal conditions and being yieldable, at least generally longitudinally, to permit limited movement of the second latch member whereby the second latch member may remain in engagement with the first latch member to tether the door in a substantially closed position when the door is moved relative to the frame.

References Cited

UNITED STATES PATENTS

| | | | |
|---|---|---|---|
| 1,734,282 | 11/1929 | White | 292—113 X |
| 2,523,088 | 9/1950 | Beyer | 292—340 X |
| 2,590,423 | 3/1952 | Laurin et al. | |
| 2,715,538 | 8/1955 | Janonis | 292—340 X |
| 2,917,770 | 12/1959 | Etnyre | 292—275 X |
| 3,066,964 | 12/1962 | Lemaire. | |

FOREIGN PATENTS

| | | |
|---|---|---|
| 844,889 | 5/1939 | France. |
| 802,958 | 10/1958 | Great Britain. |

MARVIN A. CHAMPION, *Primary Examiner.*

RICHARD E. MOORE, *Assistant Examiner.*